United States Patent
Lin et al.

(10) Patent No.: US 8,949,491 B1
(45) Date of Patent: Feb. 3, 2015

(54) BUFFER MEMORY RESERVATION TECHNIQUES FOR USE WITH A NAND FLASH MEMORY

(71) Applicant: SanDisk Technologies Inc., Plano, TX (US)

(72) Inventors: Gary Lin, San Jose, CA (US); Robert Jackson, Milpitas, CA (US); Yoav Weinberg, Thornhill (CA); William L. Guthrie, Santa Cruz, CA (US); Girish B. Desai, Cupertino, CA (US)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 13/940,050

(22) Filed: Jul. 11, 2013

(51) Int. Cl.
*G06F 3/00* (2006.01)
*G06F 5/14* (2006.01)
*G06F 12/02* (2006.01)

(52) U.S. Cl.
CPC .............. *G06F 5/14* (2013.01); *G06F 12/0246* (2013.01)
USPC ................... 710/53; 710/52; 710/54; 710/55; 710/56; 710/57

(58) Field of Classification Search
None
See application file for complete search history.

(56) References Cited

U.S. PATENT DOCUMENTS

| | | | | |
|---|---|---|---|---|
| 5,093,912 A | * | 3/1992 | Dong et al. | 718/104 |
| 5,675,797 A | * | 10/1997 | Chung et al. | 718/104 |
| 5,784,698 A | * | 7/1998 | Brady et al. | 711/171 |
| 5,784,699 A | * | 7/1998 | McMahon et al. | 711/171 |
| 5,872,952 A | * | 2/1999 | Tuan et al. | 714/724 |
| 6,088,767 A | * | 7/2000 | Dan et al. | 711/129 |
| 6,279,052 B1 | * | 8/2001 | Upadrastra | 710/22 |
| 6,505,283 B1 | * | 1/2003 | Stoney | 711/170 |
| 6,515,963 B1 | * | 2/2003 | Bechtolsheim et al. | 370/229 |
| 6,601,118 B1 | * | 7/2003 | Rooney | 710/56 |
| 6,618,790 B1 | * | 9/2003 | Talreja et al. | 711/105 |
| 6,931,497 B2 | | 8/2005 | Clayton et al. | |
| 6,961,835 B2 | | 11/2005 | Lightstone et al. | |
| 7,382,652 B2 | * | 6/2008 | Shiga et al. | 365/185.17 |
| 7,405,972 B1 | * | 7/2008 | Lin | 365/185.05 |
| 7,434,021 B2 | * | 10/2008 | Chauvel et al. | 711/170 |

(Continued)

FOREIGN PATENT DOCUMENTS

EP 1 462 944 A2 9/2004

OTHER PUBLICATIONS

"Goal-oriented dynamic buffer pool management for data base systems" by Jen-Yao Chung, Donald Ferguson, George Wang, Workshop on Quality of Service in Open Distributed Processing, Brisbane Australia, Feb. 20-24, 1995.*

(Continued)

*Primary Examiner* — Henry Tsai
*Assistant Examiner* — Jing-Yih Shyu
(74) *Attorney, Agent, or Firm* — Brinks Gilson & Lione (57) ABSTRACT

Buffer memory reservation techniques for use with NAND flash memory include dynamically reserving regions of the buffer memory, responsive to a read/write request. Where the read/write request includes a plurality of data transfer requests, following completion of a data transfer request, the reserved buffer space may be recycled for use in a further data transfer request or for other purposes. During fulfillment of a read request, a buffer region is reserved from a larger buffer pool for a time period significantly smaller than the time required to execute a sense operation associated with the read request. The reserved buffer region may be reused for unrelated processes during execution of the sense operation.

20 Claims, 7 Drawing Sheets

(56) References Cited

U.S. PATENT DOCUMENTS

| | | | |
|---|---|---|---|
| 7,801,163 B2 * | 9/2010 | Mansour et al. | 370/412 |
| 8,125,904 B2 * | 2/2012 | Lund | 370/231 |
| 2004/0205092 A1 | 10/2004 | Longo et al. | |
| 2005/0010723 A1 * | 1/2005 | Cho et al. | 711/118 |
| 2007/0198799 A1 | 8/2007 | Shinohara et al. | |
| 2007/0280111 A1 * | 12/2007 | Lund | 370/235 |
| 2008/0147915 A1 * | 6/2008 | Kleymenov | 710/52 |
| 2010/0122016 A1 * | 5/2010 | Marotta et al. | 711/103 |
| 2011/0137889 A1 * | 6/2011 | Nayberg | 707/713 |
| 2011/0153917 A1 | 6/2011 | Maita et al. | |
| 2011/0208896 A1 * | 8/2011 | Wakrat et al. | 711/103 |
| 2011/0320731 A1 * | 12/2011 | Ambroladze et al. | 711/133 |

OTHER PUBLICATIONS

Kang et al., Power-Aware Data Buffer Cache Management in Real-Time Embedded Databases, IEEE, 2008, 10 pages.

International Search Report and Written Opinion for corresponding application PCT/US2014/045621, Oct. 22, 2014, 9p.

\* cited by examiner

BUFFER MEMORY RESERVATION TECHNIQUES FOR USE WITH A NAND FLASH MEMORY

TECHNICAL FIELD

This disclosure relates generally to buffer management techniques, and more particularly to techniques for improving buffer utilization efficiency.

DESCRIPTION OF THE RELATED TECHNOLOGY

I/O circuits including input buffer memory are utilized in a variety of devices and systems. For example, I/O circuits and buffer memory may be used in connection with nonvolatile memory (NVM) systems for a variety of applications. Some nonvolatile memory systems are embedded in a larger system such as a personal computer, for example, as a Solid State Drive (SSD). Other removable nonvolatile memory systems are connected to a host system and may be interchanged between different host systems. Examples of nonvolatile memory systems include memory cards, USB flash drives, and removable SSDs. Electronic circuit cards, including nonvolatile memory cards, have been commercially implemented according to a number of well-known standards. Memory cards are used with personal computers, cellular telephones, personal digital assistants (PDAs), digital still cameras, digital movie cameras, portable audio players and other host electronic devices for the storage of large amounts of data.

Such cards usually contain a re-programmable non-volatile semiconductor memory cell array along with a controller that controls and supports operation of the memory cell array and interfaces with a host to which the card is connected. Several of the same type of card may be interchanged in a host card slot designed to accept that type of card. Memory card standards include PC Card, CompactFlash™ card (CF™ card), SmartMedia™ card, MultiMediaCard (MMC™), Secure Digital (SD) card, miniSD™ card, Subscriber Identity Module (SIM), Memory Stick™, Memory Stick Duo card and microSD/TransFlash™ memory module standards.

In response to a read request or a write request from the host, the controller may be configured to manage the NVM and buffer memory, so as to fulfill the request. Request fulfillment should be as speedy and reliable as possible, while minimizing system overhead requirements such as buffer memory capacity. To accomplish these objectives, buffer management techniques that improve buffer utilization efficiency are desirable.

SUMMARY

This disclosure provides examples of circuits, devices, systems, and methods for managing buffer memory. In an implementation, a buffer is managed by receiving, at a memory controller, a read/write request from a host, the read/write request corresponding to a plurality of data transfer requests. The memory controller: (i) dynamically reserves, responsive to the read/write request, at least one buffer region from the buffer; (ii) assigns a dynamic buffer group index (DBGI) to each reserved buffer region; (iii) associates the DBGI with the read/write request; (iv) receives at least one of the data transfer requests; (v) associates the DBGI with the at least one data transfer requests; (vi) selects one or more reserved buffer regions having been assigned the DBGI; and (vii) executes the at least one data transfer request using the selected one or more reserved buffer regions.

In some implementations the selected one or more reserved buffer regions may be released for reuse. The buffer may be a portion of a non-volatile memory array or a portion of a random access memory.

In some implementations, the memory controller is in firmware.

In a further implementation a memory device includes a non-volatile memory array, a buffer memory, and a memory controller. The memory controller is configured to: receive a read/write request from a host, the read/write request corresponding to a plurality of data transfer requests; dynamically reserve, responsive to the read/write request, at least one buffer region from the buffer memory; assign a dynamic buffer group index (DBGI) to each reserved buffer region; associate the DBGI with the read/write request; receive at least one of the data transfer requests; associate the DBGI with the at least one data transfer requests; select one or more reserved buffer regions having been assigned the DBGI; and execute the at least one data transfer request, from the non-volatile memory array to the host, using the selected one or more reserved buffer regions.

In some implementations data is read from a memory by:
(i) receiving, at a memory controller, from a host, a request to read a data block from the memory;
(ii) performing a sense operation on a first portion of the NAND flash memory, the first portion being within the data block and substantially smaller than the data block;
(iii) preparing first results of the sense operation for transfer to the host; (iv) reserving a first region of a buffer, the reserved buffer region being at least as large as the first portion and substantially smaller than the data block; (v) storing the first results in the reserved buffer region; and (vi) transferring the first results from the reserved buffer region to the host.

In some implementations a sense operation may be performed on a second portion of the memory, the second portion being within the data block and substantially smaller than the data block; second results of the sense operation may be prepared for transfer to the host, and stored in a second region of the buffer; and the second results may be transferred from the second region of the buffer to the host. The first region and the second region describe an identical single region of the buffer.

In some implementations, the first region of the buffer may be made available for an unrelated process during the sense operation.

In some implementations, the request to read a data block may identify a smallest requested data unit and a size of the buffer may be selected to correspond with the smallest requested data unit. A size of the data block may be 16 K and the smallest data unit may be 4 K.

In a yet further implementation, a memory device includes a non-volatile memory array, a buffer memory, and a memory controller. The memory controller is configured to: receive, at a memory controller, from a host, a request to read a data block from the memory; perform a sense operation on a first portion of the NAND flash memory, the first portion being within the data block and substantially smaller than the data block; prepare first results of the sense operation for transfer to the host; reserve a first region of a buffer, the reserved buffer region being at least as large as the first portion and substantially smaller than the data block; store the first results in the reserved buffer region; and transfer the first results from the reserved buffer region to the host.

BRIEF DESCRIPTION OF THE DRAWINGS

Like reference numbers and designations in the various drawings indicate like elements.

DETAILED DESCRIPTION

This disclosure provides examples of circuits, devices, systems, and methods for managing buffer memory associated with an NVM or flash memory device. Particular implementations described herein relate to circuits, devices, systems, and methods that improve buffer utilization efficiency. In some implementations, buffer utilization efficiency is improved by dynamically allocating buffer space following receipt of read/write request. In some implementations, a region of a buffer is reserved for use during data transfer from a non-volatile memory array, and made available for an unrelated process during a sense operation associated with the data transfer.

The circuits described herein can be utilized in a variety of applications. In some implementations, the circuits described herein are used in digital electronic devices or systems. For example, in some implementations, the circuits described herein can be used in a memory device. For example, the circuits can be used in solid state memory devices such as memory cards, USB flash drives, and removable SSDs. In some implementations, the circuits can be input/output I/O circuits (or interfaces) for a controller, such as a memory controller. In some implementations, the memory controller can be used in a host interface for a memory card such as, for example, a PC Card, a CF™ card, a SmartMedia™ card, a MMC™ card, an SD card, a miniSD™ card, a SIM card, a Memory Stick™ card, a Memory Stick Duo card, a microSD/ TransFlash™ card, a Compact Flash card, or an iNAND card. In some other implementations, the circuits can be used in other devices or systems. Generally, various implementations described herein can be used in any circuit in which speed and noise immunity are desired, including non-memory circuits.

Figure 1:
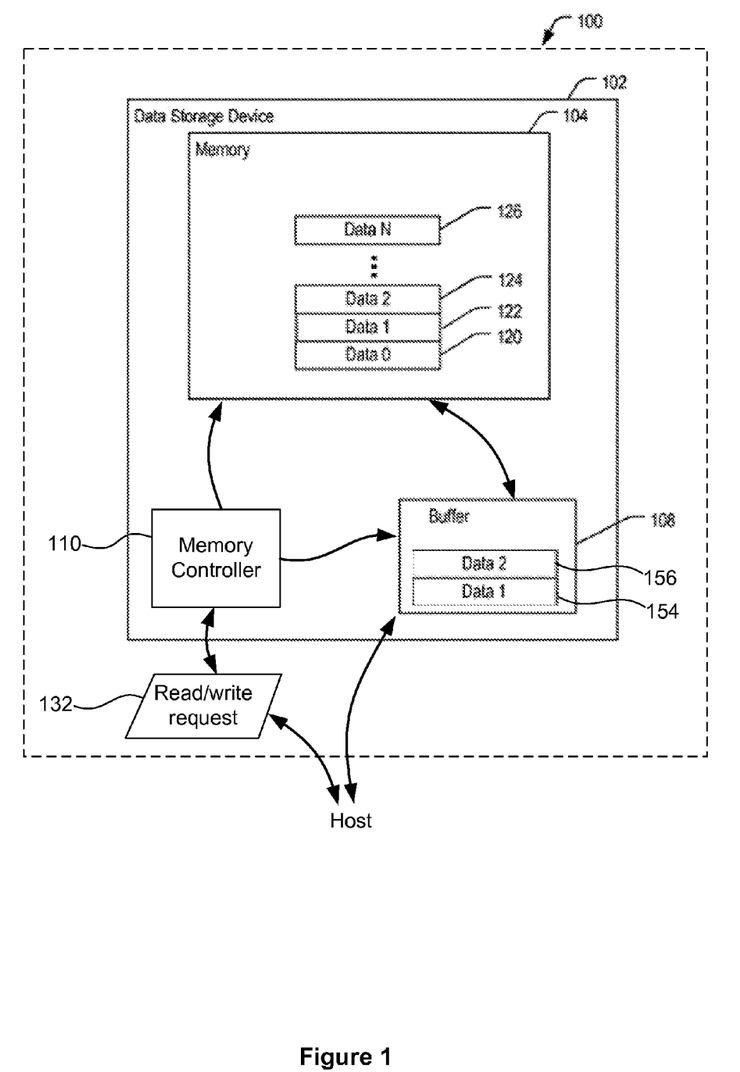
FIG. 1 illustrates a block diagram of an example system including a memory device.

Referring to FIG. 1, a particular embodiment of a system 100 including a data storage device 102 is illustrated. The data storage device 102 may respond to a request 132 from the host device to read or write data from/to the data storage device 102. More particularly, the host device may interface with a memory controller 110, which may be configured to control data transfer from/to a memory 104 and a buffer 108.

The host device may be, for example, a mobile telephone, a music or video player, a personal digital assistant (PDA), a gaming device, an electronic-book reader, a camera, a computer (such as a laptop or notebook computer), any other electronic device, or any combination thereof that is configured to be operatively coupled to the data storage device 102. The host device may be configured to send instructions to the data storage device 102, such as read/write request 132.

The data storage device 102 may be a memory card, such as a Secure Digital SD® card, a microSD® card, a miniSD® card (trademarks of SD-3C LLC, Wilmington, Del.), a MultiMediaCard™ (MMC™) card (trademark of JEDEC Solid State Technology Association, Arlington, Va.), or a CompactFlash™ (CF) card (trademark of SanDisk Corporation, Milpitas, Calif.). As another example, the data storage device 102 may be an embedded memory in the host device, such as eMMC™ (trademark of JEDEC Solid State Technology Association, Arlington, Va.) and eSD, as illustrative examples.

In the illustrated implementation, data storage device 102 includes the memory controller 110, the memory 104, and the buffer 108. The memory 104 may be a solid state non-volatile memory, such as a flash memory. In some implementations, the memory 104 may include a NAND flash memory array.

The memory controller 110 may be configured to receive messages, such as the read/write request 132 from the host device. The read/write request 132 may include a request for read access or a request for write access to the memory 104. For example, the controller 110 may be configured to control retrieval of data from the memory 104 that is requested by the host device and to control sending of requested data to the host device. Similarly, the controller 110 may be configured to control recording of data to the memory 104 that is requested by the host device and to initiate reception of requested data from the host device.

The memory 104 may include stored data, addressable in terms of data blocks, such as data block 0 120 through data block N 126. For example, the memory 104 may include first data block (Data 1) 122 that is sequentially followed by second data block (Data 2) 124. To illustrate, each data block may correspond to one or more word lines of the memory 104, portions of a word line, such as sectors, or data stored in multiple sequential memory addresses of the memory 104, as illustrative, non-limiting examples. Although the memory 104 is illustrated as storing the data blocks 120-126, it will be appreciated that the memory 104 may, additionally, store other data.

The buffer 108 may be configured to store data that is accessible to be read from or written to the buffer 108 by the host device. As an illustrative example, the buffer 108 may include a random access memory (RAM) that is accessible by the controller 110. Data read from the memory 104 may be processed prior to being usable by the host device. As an example, error correction processing, such as an error correction coding (ECC) process, may be performed on the data that is read from the memory 104 to identify and correct one or more bit errors that may occur within the memory 104 and/or during a data transfer operation. The error corrected data may be stored within the buffer 108, such as buffered first data 154 (Data 1) and buffered second data 156 (Data 2), as illustrated in FIG. 1.

During operation, the read/write request 132 may be sent from the host device and received at the memory controller 110. In response to receiving the read/write request 132, the memory controller 110 may reserve regions of buffer 108 to facilitate transfer of data between the memory 104 and the host device. For example, in the illustrated implementation, a reserved buffer region (RBR) may be allocated for each of Data 1 154 and Data 2 156, which correspond, respectively, to Data 1 122 and Data 2 124.

In the absence of the present teachings, an RBR is allocated statically, meaning one or both of the size and location of the RBR is fixed while fulfillng a read/write request execution or during a time period that an associated data path is established.

Figure 2:
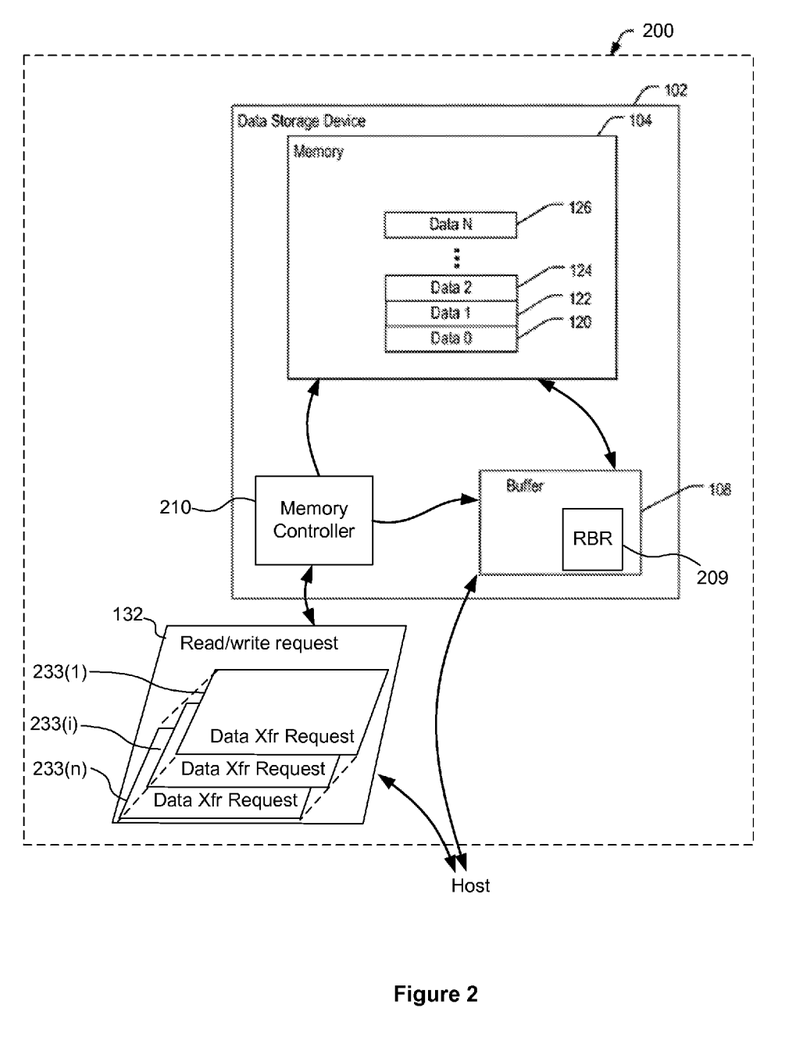
FIG. 2 illustrates a block diagram of a system implementation including a memory device.

Referring now to FIG. 2, a system 200 wherein buffer memory for a read or write operation is dynamically reserved will be described. In some implementations, memory controller 210 may be configured to receive read/write request 132 from the host device. The read/write request 132 may correspond to, and/or include, a plurality of data transfer requests 233. Responsive to the read/write request, the memory controller 210 may be configured to dynamically reserve at least one RBR 209 from the buffer.

Memory controller 210 may be configured to assign a dynamic buffer group index (DBGI) to each RBR and associate the DBGI with the read/write request 132. Then, when memory controller 210 receives a data transfer request 233(i), the memory controller may be configured to associate the DBGI with the data transfer requests 233(i) and to select the RBR 209 as having been assigned the DBGI.

Finally, the memory controller 210 may be configured to execute data transfer request 233(i) using the selected RBR 209.

Figure 3:
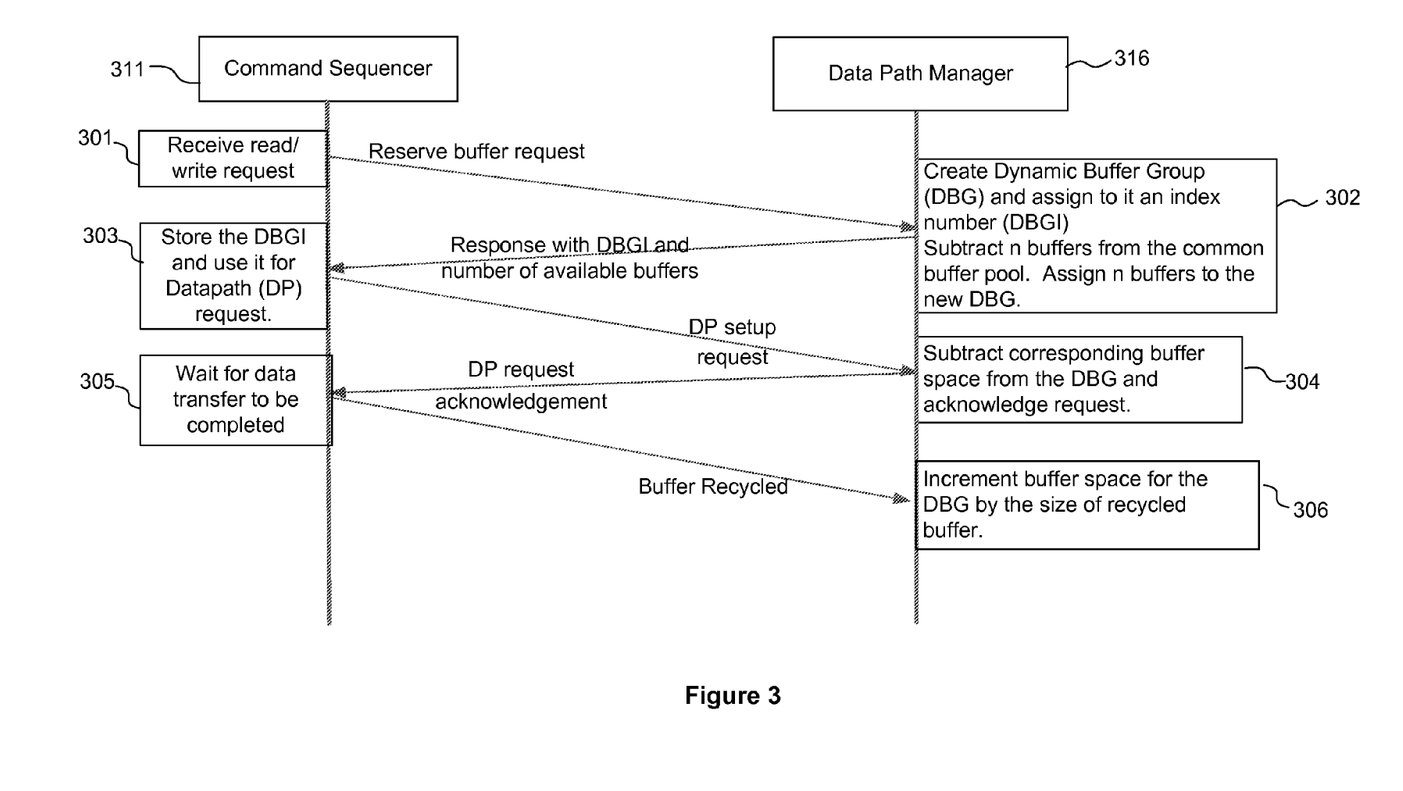
FIG. 3 illustrates a logic block diagram of an implementation for managing a buffer of a memory device.

Certain features and benefits of the presently disclosed techniques may be better appreciated by referring to FIG. 3. For purposes of illustration, certain functionalities of memory controller 210 are divided into functional blocks labeled as command sequencer 311 and data path manager 316. To execute read/write request 132, including multiple data transfer requests 233(i), command sequencer 311 and data path manager 316 may be configured to exchange instructions and information in the following manner.

At block 301, command sequencer 311 may receive read/write request 132. Although applicable to either read or write operations, the presently disclosed techniques are most advantageous when read/write request 132 is a write request, particularly where the write request includes a large number of data transfer requests 233(i).

Based on the received read/write request 132, command sequencer 311 may transmit to data path manager 316 a request to reserve buffer space. Responsive to the request, the data path manager 316 may, at block 302, create a dynamic buffer group (DBG). The DBG may also be assigned a respective dynamic buffer group index (DBGI). In an implementation, the data path manager 316 may assign to the DBG some number 'n' of discrete buffer regions drawn from a common buffer pool. Accordingly, the data path manager 316 may withdraw (subtract) n buffers from the common buffer pool.

Data path manager 316 may then transmit to command sequencer 311 a response that includes the DBGI and the number of available buffers, and/or some other indication of the size of the buffer space assigned to the DBG.

At block 303, command sequencer 311 may store the DBGI and use it in subsequent datapath (DP) requests. Command sequencer 311 may then transmit to data path manager 316 a DP setup request.

The data path manager 316 may, at block 304, subtract an amount of buffer space from the DBG corresponding to the DP request, and transmit an acknowledgment of the DP request to the command sequencer 311. In some implementations, if an amount of available buffer space is insufficient to fulfill the DP request, data path manager 316 may pause the process until sufficient buffer space becomes available.

After receipt of the DP request acknowledgment, command sequencer 311 may, at block 305, wait for the requested data transfer to be completed. Following completion of the data transfer request, the reserved buffer space may be recycled, and, for example, may be made available for use in a further data transfer request or for other purposes, thereby improving buffer utilization efficiency.

Finally, at block 306, the data path manager 316 may increment the size of the DBG by an amount corresponding to the size of the recycled buffer space.

Figure 4:
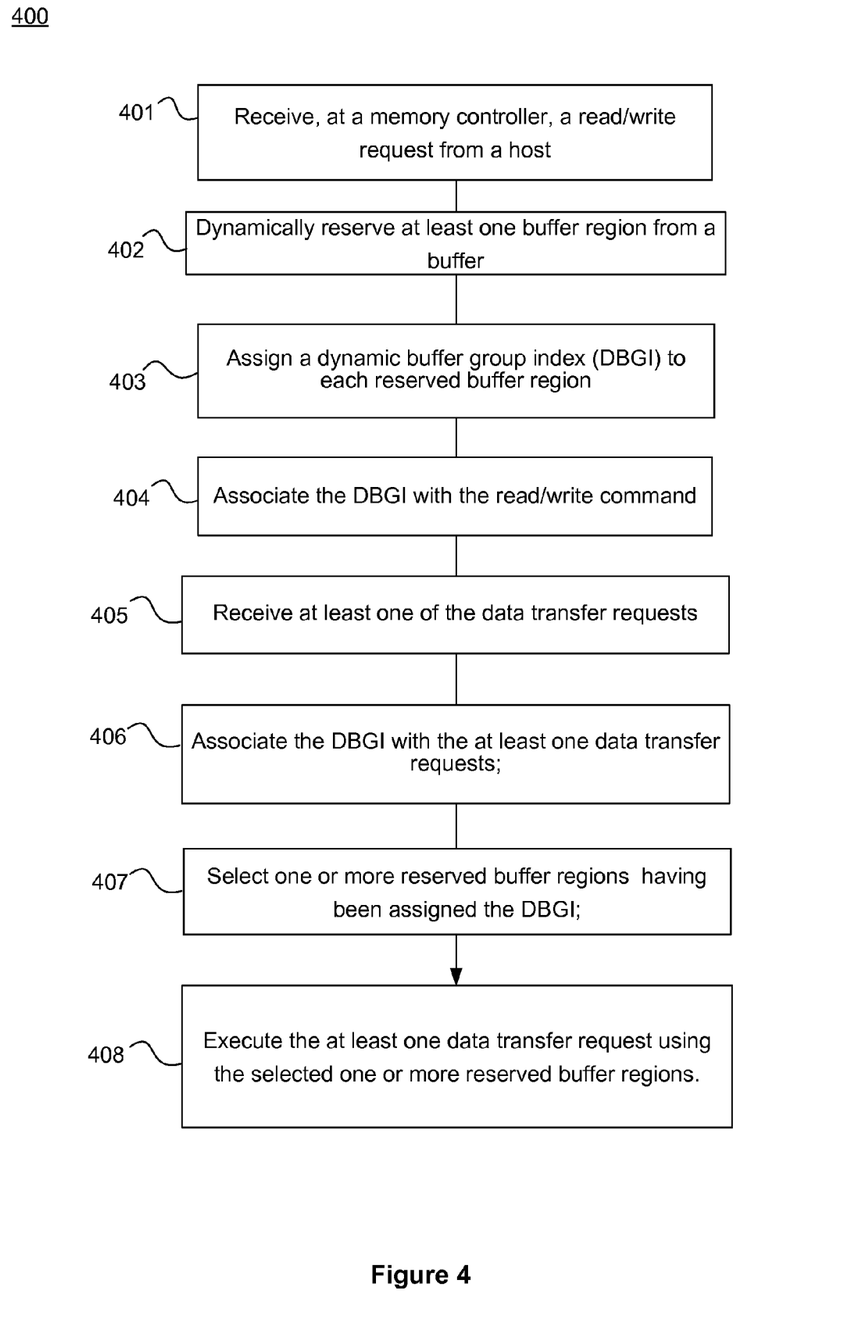
FIG. 4 illustrates a process flow diagram of an implementation for managing a buffer of a memory device.

Referring now to FIG. 4, a method 400 for managing a buffer will be described. In some implementations, the method 400 may be executed by a memory controller, the memory controller interfacing with a host to execute read/write requests from/to a solid state non-volatile memory, the read/write requests being received from a host.

At block 401, a read/write request may be received from the host. The read/write request may correspond to or include a number of data transfer requests. In some implementations, the read/write request may be received by a command sequencer of the memory controller.

At block 402, responsive to the read/write request, at least one buffer region may be dynamically reserved from the buffer. At block 403, a dynamic buffer group index (DBGI) may be assigned to each reserved buffer region. In some implementations, the DBGI may be assigned by a data path manager of the memory controller.

A block 404, the DBGI may be associated with the read/write request. At block 405, at least one of the data transfer requests may be received. At block 406, the DBGI may be associated with the at least one data transfer requests.

At block 407, one or more reserved buffer regions may be selected, the reserved buffer regions having been assigned the DBGI.

At block 408, the at least one data transfer request may be executed using the selected one or more reserved buffer regions. Although not illustrated in FIG. 4, in some implementations it is contemplated that, subsequent to block 408, the selected one or more reserved buffer regions may be released for reuse.

Figure 5:
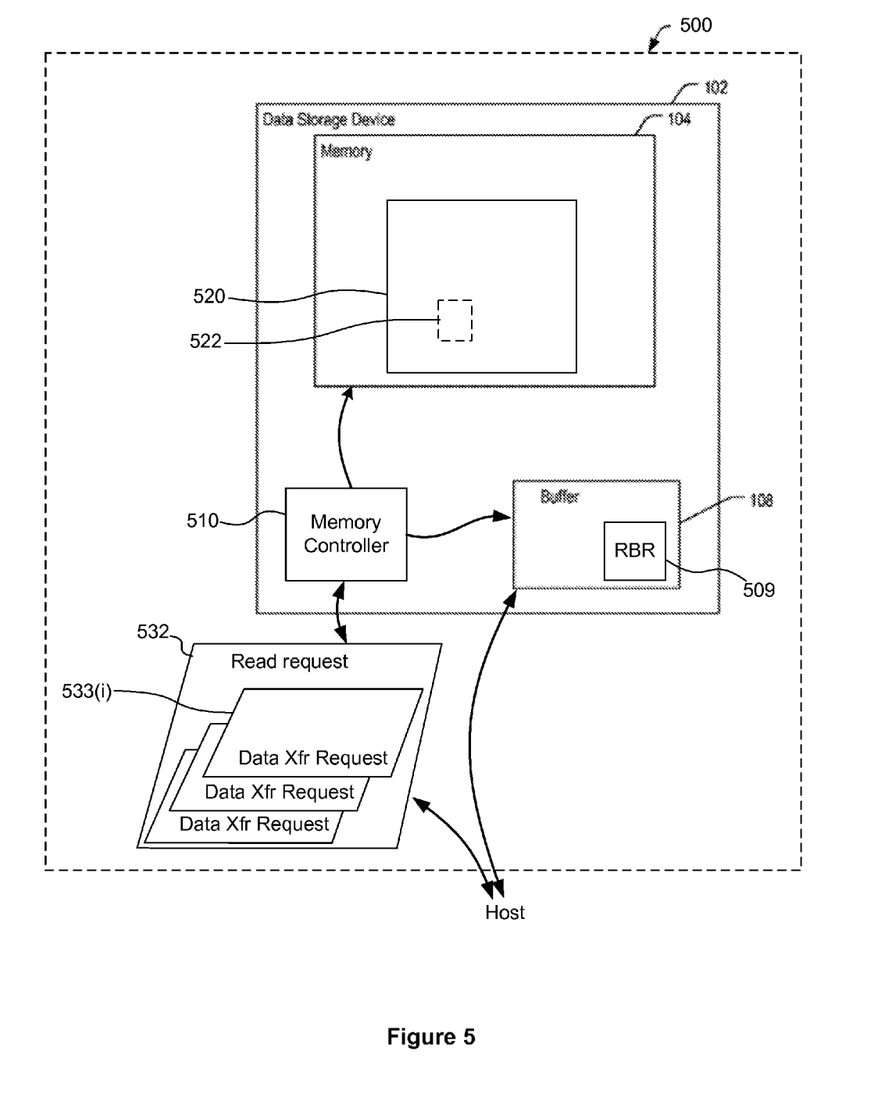
FIG. 5 illustrates a block diagram of a further system implementation including a memory device.

Referring now to FIG. 5 a system 500 wherein buffer memory for a read operation is dynamically allocated will be described. Advantageously, buffer memory is reserved for the read operation during a time period when a data transfer operation is actually being executed, and the buffer memory is permitted to be released for other purposes at other times. The memory controller 510 may be configured to receive, from a host, a read request 532 to read a data block 520 from memory 104. Memory 104 may be a non-volatile memory, such as a NAND flash memory array, for example. In the illustrated implementation, memory controller 510 may be configured to perform a sense operation on a first portion 522 of the memory 104, the first portion 522 being within the data block 520 and substantially smaller than the data block 520.

Memory controller 510 may be further configured to prepare first results of the sense operation for transfer to the host, and to reserve a reserved buffer region (RBR) 509, the RBR 509 being at least as large as the first portion 522 and substantially smaller than the data block 520.

The RBR 509 may be configured to store the first results, and memory controller 510 may then transfer the first results from the RBR 509 to the host.

Figure 6:
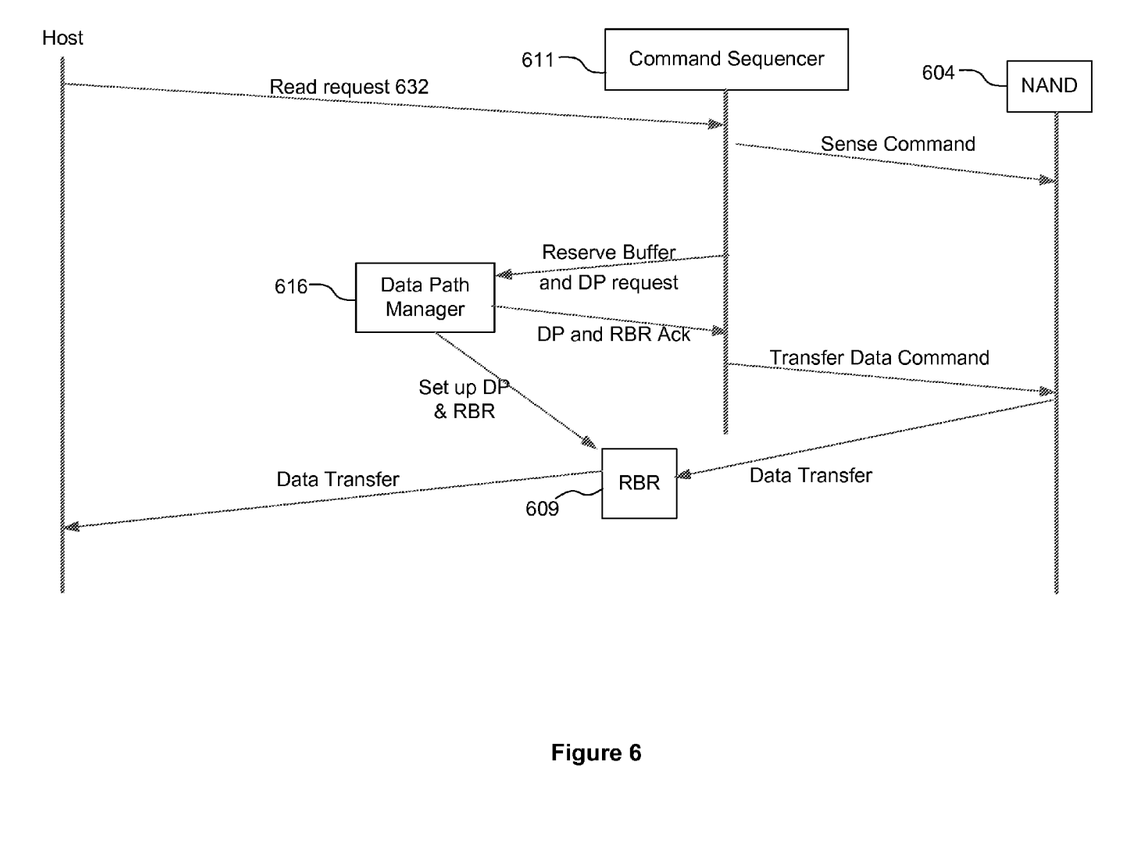
FIG. 6 illustrates a logic block diagram of an implementation for managing a buffer of a memory device.

Certain features and benefits of the presently disclosed techniques may be better appreciated by referring to FIG. 6. For purposes of illustration, certain functionalities of memory controller 510 have been divided into functional blocks labeled as command sequencer 611 and data path manager 616, and memory 604 is assumed to be a NAND memory array. Read request 632 may relate to a data block and include multiple data transfer requests 533(i). In response to read request 632, command sequencer 611 and data path manager 616 may cause the read request to be fulfilled in the following manner.

After the command sequencer 611 receives read request 632, command sequencer 611 may send a sense command to NAND 604. More particularly, command sequencer 611 may perform a sense operation on a first portion of NAND flash memory array 604, the first portion being within the data block and substantially smaller than the data block.

Also responsive to the received read request 632, command sequencer 611 may transmit to data path manager 616 a request to reserve buffer space and set up a data path. More particularly, command sequencer 611 may request reserving a region of a buffer, the reserved buffer region being at least as large as the first portion and substantially smaller than the data block.

Responsive to the request, the data path manager 616 may set up the requested data path and reserve RBR 609, RBR 609 being at least as large as the first portion and substantially smaller than the data block.

Data path manager 616 may then transmit to command sequencer 611 an acknowledgement that the requested data path and RBR 609 have been established.

Command sequencer 611 may then cause initiation of a data transfer from NAND 604 to RBR 609. In the illustrated implementation, command sequencer 611 may send a transfer data command to NAND 604. Data is then transferred, by way of RBR 609 to the host. In some implementations, data may be stored in RBR 609 until successful transfer of the data to the host is verified.

Advantageously, RBR 609 is reserved from a larger buffer pool for a time period significantly smaller than the time required to execute sense operation and set up the data path. As a result, the buffer memory that is reserved in RBR 609 during data transfer operations can be reused for unrelated processes during, for example, the sense operation. As a result, buffer utilization efficiency is improved.

Figure 7:
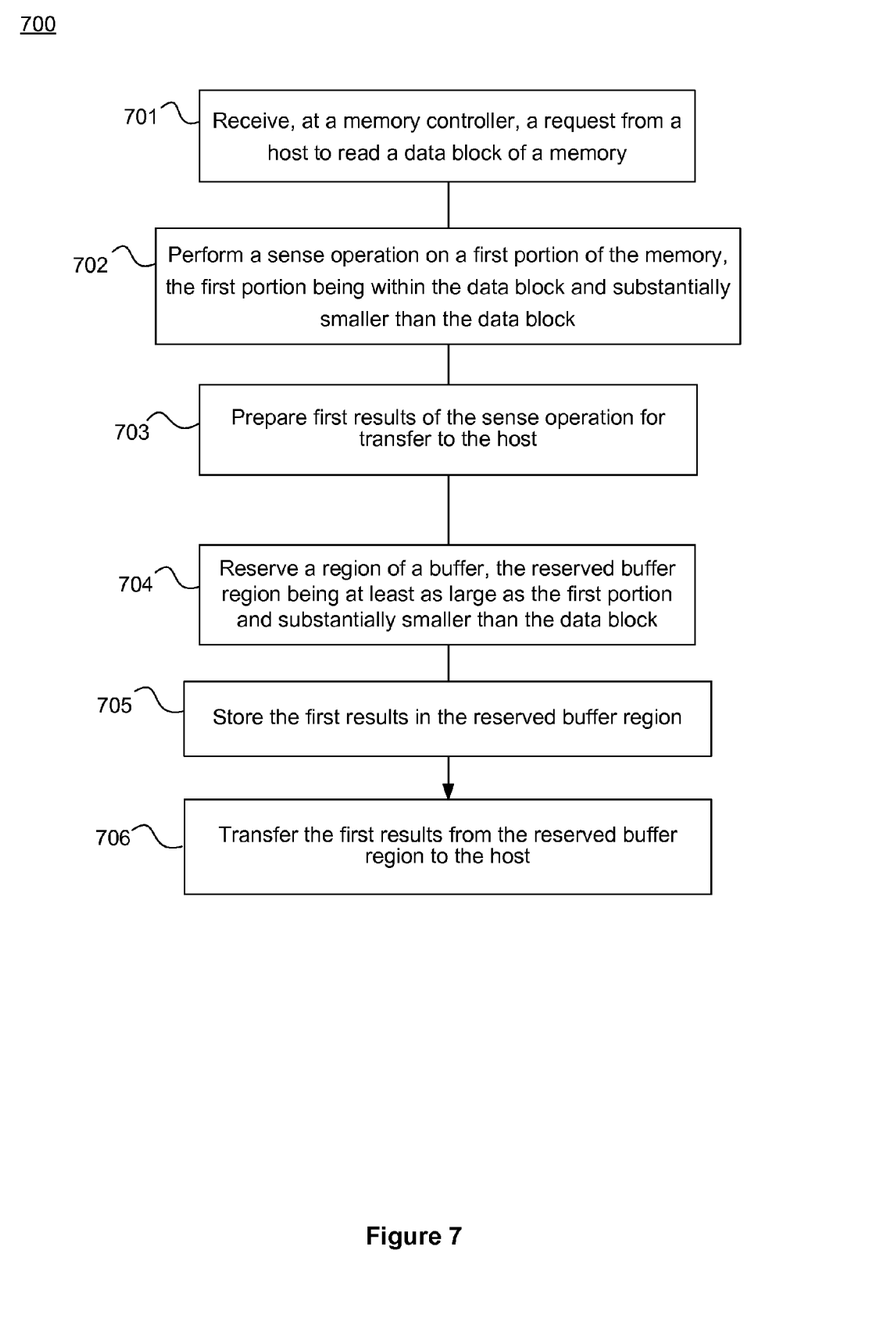
FIG. 7 illustrates a process flow diagram of an implementation for managing a buffer of a memory device.

Referring now to FIG. 7, a method 700 for reading data from a memory will be described. In some implementations, the memory may include a NAND flash memory, for example. In some implementations the method may be executed by a memory controller, the memory controller interfacing with a host to fulfill a read request from a NAND flash memory or other solid state non-volatile memory.

At block 701, a request to read a data block of a memory may be received. In some implementations, the read request may be received by a command sequencer of the memory controller.

At block 702, responsive to the read request, a sense operation on a first portion of the memory may be performed. Advantageously, the first portion is within the data block and substantially smaller than the data block.

At block 703, first results of the sense operation may be prepared for transfer to the host. At block 704, a region (RBR) of a buffer may be reserved. The RBR, advantageously, is at least as large as the first portion and substantially smaller than the data block. In some implementations, the read request identifies a smallest requested data unit and a size of the RBR is selected to correspond with the smallest requested data unit. For example, a size of the data block may be 16 K and the smallest data unit may be 4 K.

At block 705, the first results may be stored in the RBR. At block 706, the first results may be transferred from the RBR to the host.

Thus, improved buffer management techniques have been disclosed. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method comprising:
receiving, at a memory controller of a data storage device, the data storage device including a buffer memory and a NAND flash memory array, a read/write request from a host, the read/write request corresponding to a plurality of data transfer requests between the host and the NAND flash memory array; and, with the memory controller:
dynamically reserving, responsive to the read/write request, a plurality of buffer regions from the buffer memory;
assigning a dynamic buffer group index (DBGI) to each reserved buffer region;
associating the DBGI with the read/write request;
receiving at least one of the plurality of data transfer requests;
associating the DBGI with the at least one data transfer requests between the host and the NAND flash memory array;
selecting one or more reserved buffer regions having been assigned the DBGI;
executing the at least one data transfer request between the NAND flash memory array and the host using the selected one or more reserved buffer regions.

2. The method of claim 1, further comprising releasing, for reuse, the selected one or more reserved buffer regions.

3. The method of claim 1, wherein the buffer memory is a portion of a non-volatile memory array.

4. The method of claim 1, wherein the buffer memory is a portion of a random access memory.

5. The method of claim 1, wherein the memory controller is in firmware.

6. A data storage device comprising:
a NAND flash memory array;
a buffer memory; and
a memory controller, the memory controller configured to:
receive a read/write request from a host, the read/write request corresponding to a plurality of data transfer requests between the host and the NAND flash memory array;
dynamically reserve, responsive to the read/write request, a plurality of buffer regions from the buffer memory;
assign a dynamic buffer group index (DBGI) to each reserved buffer region;
associate the DBGI with the read/write request;
receive at least one of the plurality of data transfer requests;
associate the DBGI with the at least one data transfer requests between the host and the NAND flash memory array;
select one or more reserved buffer regions having been assigned the DBGI; and
execute the at least one data transfer request between the NAND flash memory array and the host, using the selected one or more reserved buffer regions.

7. The data storage device of claim 6, the memory controller further configured to release, for reuse, the selected one or more reserved buffer regions.

8. The data storage device of claim 6, wherein the buffer memory is a portion of the non-volatile memory array.

9. The data storage device of claim 6, wherein the buffer memory is a portion of a random access memory.

10. A method comprising:
receiving, at a memory controller, from a host, a request to read a data block from a memory;
performing a sense operation, in response to a sense command, on a first portion of a NAND flash memory, the first portion being within the data block and substantially smaller than the data block;
preparing first results of the sense operation for transfer to the host;
reserving a first region of a buffer, the reserved buffer region being at least as large as the first portion and substantially smaller than the data block;
storing the first results in the reserved buffer region; and
transferring the first results from the reserved buffer region to the host.

11. The method of claim 10, further comprising:
performing a sense operation, in response to a sense command, on a second portion of the NAND flash memory, the second portion being within the data block and substantially smaller than the data block;
preparing second results of the sense operation for transfer to the host, and storing said second results in a second region of the buffer; and
transferring the second results from the second region of the buffer to the host.

12. The method of claim 11, wherein the first region and the second region describe an identical single region of the buffer.

13. The method of claim 10, further comprising making the first region of the buffer available for an unrelated process during the sense operation.

14. The method of claim 10, wherein the request to read a data block identifies a smallest requested data unit, the method further comprising selecting a size of the buffer to correspond with the smallest requested data unit.

15. The method of claim 10, wherein a size of the data block is 16 K and the smallest data unit is 4 K.

16. A memory device comprising:
a NAND flash memory array;
a buffer memory; and
a memory controller, the memory controller configured to:
receive, from a host, a request to read a data block from the NAND flash memory array;
perform a sense operation, in response to a sense command, on a first portion of the NAND flash memory array, the first portion being within the data block and substantially smaller than the data block;
prepare first results of the sense operation for transfer to the host;
reserve a first region of a buffer, the reserved buffer region being at least as large as the first portion and substantially smaller than the data block;
store the first results in the reserved buffer region; and
transfer the first results from the reserved buffer region to the host.

17. The memory device of claim 16, the memory controller being further configured to:
perform a sense operation, in response to a sense command, on a second portion of the NAND flash memory array, the second portion being within the data block and substantially smaller than the data block;
prepare second results of the sense operation for transfer to the host, and storing said second results in a second region of the buffer; and
transfer the second results from the second region of the buffer to the host.

18. The memory device of claim 17, wherein the first region and the second region describe an identical single region of the buffer.

19. The memory device of claim 16, further comprising making the first region of the buffer available for an unrelated process during the sense operation.

20. The memory device of claim 16, wherein the request to read a data block identifies a smallest requested data unit and further comprising selecting a size of the buffer to correspond with the smallest requested data unit.

* * * * *